United States Patent

Ono et al.

[11] Patent Number: 5,696,878
[45] Date of Patent: Dec. 9, 1997

[54] SPEAKER NORMALIZATION USING CONSTRAINED SPECTRA SHIFTS IN AUDITORY FILTER DOMAIN

[75] Inventors: Yoshio Ono; Yunxin Zhao; Hisashi Wakita, all of Santa Barbara, Calif.

[73] Assignee: Panasonic Technologies, Inc., Princeton, N.J.

[21] Appl. No.: 123,637

[22] Filed: Sep. 17, 1993

[51] Int. Cl.⁶ .................................................. G10L 5/06
[52] U.S. Cl. .......................... 395/2.59; 395/2.14
[58] Field of Search ...................... 395/2.14, 2.18, 395/2, 2.28, 2.09, 2.7, 2.64, 2.59

[56] References Cited

U.S. PATENT DOCUMENTS

| | | | |
|---|---|---|---|
| 4,087,632 | 5/1978 | Hofer | 179/1 |
| 4,827,516 | 5/1989 | Tsukahara et al. | 381/36 |
| 4,885,790 | 12/1989 | McAulay et al. | 381/36 |
| 5,054,085 | 10/1991 | Meisel et al. | 381/43 |
| 5,165,008 | 11/1992 | Hermansky et al. | 395/2 |
| 5,253,326 | 10/1993 | Yong | 395/2 |

OTHER PUBLICATIONS

Analysis and Generation of Voice Template Based on Shift Invariance of BArk Spectral Envelope Tseng et al./IEEE, Aug. 1990.
The effective Second Formant F2' and the Vocal Tract Front–Cavity Hermansky et al./IEEE, 1989.

*Primary Examiner*—Allen R. MacDonald
*Assistant Examiner*—Richemond Dorvil
*Attorney, Agent, or Firm*—Harness, Dickey & Pierce, P.L.C.

[57] ABSTRACT

A speaker normalization method is described based on spectral shifts in the auditory filter domain. The method is characterized by using an estimated vocal tract length as a criterion to determine the spectral shift value. Certain constraints are found to be necessary for the shift in the auditory filter domain, and two techniques based on these constraints, the One-Bark shift and the refined Bark-scale shift, are introduced. When tested in vowel classification experiments, significant performance improvement was obtained for both techniques. The method is useful for speaker normalization in speaker-independent speech recognition.

14 Claims, 7 Drawing Sheets

SPEAKER NORMALIZATION USING CONSTRAINED SPECTRA SHIFTS IN AUDITORY FILTER DOMAIN

BACKGROUND AND SUMMARY OF THE INVENTION

The present invention relates generally to computerized voice recognition. More particularly, the invention relates to a speaker normalization system for selectively shifting the spectra of the speech in the auditory filter domain. The system is thus useful for removing the articulatory differences between individual speakers, such as between male and female voice, making it easier for speech recognizer circuits to operate.

A number of speaker normalization methods reported so far have focused on transformations designed to minimize differences between reference speech and input speech. But it is often difficult to associate these transformations with articulatory variations. Thus, despite previous efforts in normalization for spectral shapes or formant frequencies, there has been a general lack of sufficient experimental support addressing the optimality of such methods, in terms of the resultant spectral distortion or in terms of automatic recognition accuracy. In many practical situations, such as automatic speech recognition, spectral parameters are commonly used instead of formant frequencies. Therefore, an effective method of spectral shift is needed for these parameters. The present invention addresses this need.

The present invention uses a parameter which directly reflects articulatory variations and links that parameter to the spectral parameters in order to effectively accomplish speaker normalization. More specifically, the present invention focuses on acoustic parameter variations caused by differences in the vocal tract length (VTL) from speaker to speaker. The present invention implements a new normalization method which minimizes such variations.

In accordance with one aspect of the invention the method involves an optimally constrained spectral shift in which, depending on the speaker's vocal tract length (VTL) a 1 Bark shift is performed on preselected frequency bands above a predetermined frequency. In the preferred embodiment 17 filter banks are used from which 8th order perceptually-based linear predictive (PLP) cepstrum coefficients are derived. When shifting is indicated, based on the speaker's VTL, only those filters with indices above filter index 4 (i.e., indices 5-17) are shifted. The lower filter banks are not shifted.

In accordance with another aspect of the invention a refined Bark scale spectral shift is performed. In the refined Bark scale spectral shift the speaker's vocal tract length (VTL) is used to compute shift factors, whereby each frequency band is shifted by an optimal amount. More specifically, a sample of speech is obtained and for each vowel sample a vocal tract length is calculated in a predetermined range such as the range of about 12 to 22 centimeters (cm) such that a predefined distortion criterion is minimized. Next, the VTL of the speaker is calculated by averaging all of the VTLs computed from the vowel samples of that speaker. The speaker's VTL is then used to select a first parameter ($\alpha_i$) which serves as a vocal tract length-dependent shift factor. In addition, a filter index-dependent shift contour parameter ($\alpha_{o,i}$) is obtained from a predetermined shift contour table. Next, the first parameter and the filter-dependent shift contour factor are multiplied together to obtain a second shift parameter ($\alpha_i$), which is used to determine the frequency shift direction for a given filter band. Shifting is performed by appropriately allocating energy to the pre-established frequency bands corresponding to the filter banks. In the presently preferred refined Bark scale spectral shift embodiment the shifted energy allocated to the frequency bands may be represented using terms which correspond to 3 neighboring filter energies (before shifting) which are each modified by predetermined shaping functions, which are in turn functions of the second shift parameter $\alpha_i$.

Accordingly, as more fully set forth below, the present invention comprises the selective application of frequency shifting by energy allocation to some, but not all, of the frequency bands based on the vocal tract length of the speaker. In this way, articulatory differences between individuals such as between male and female voices are effectively removed, making it easier for generalized speech recognizer circuits to operate.

For a more complete understanding of the invention, its objects and advantages, reference may be had to the following specification and to the accompanying drawings.

DESCRIPTION OF THE PREFERRED EMBODIMENT

Figure 7:
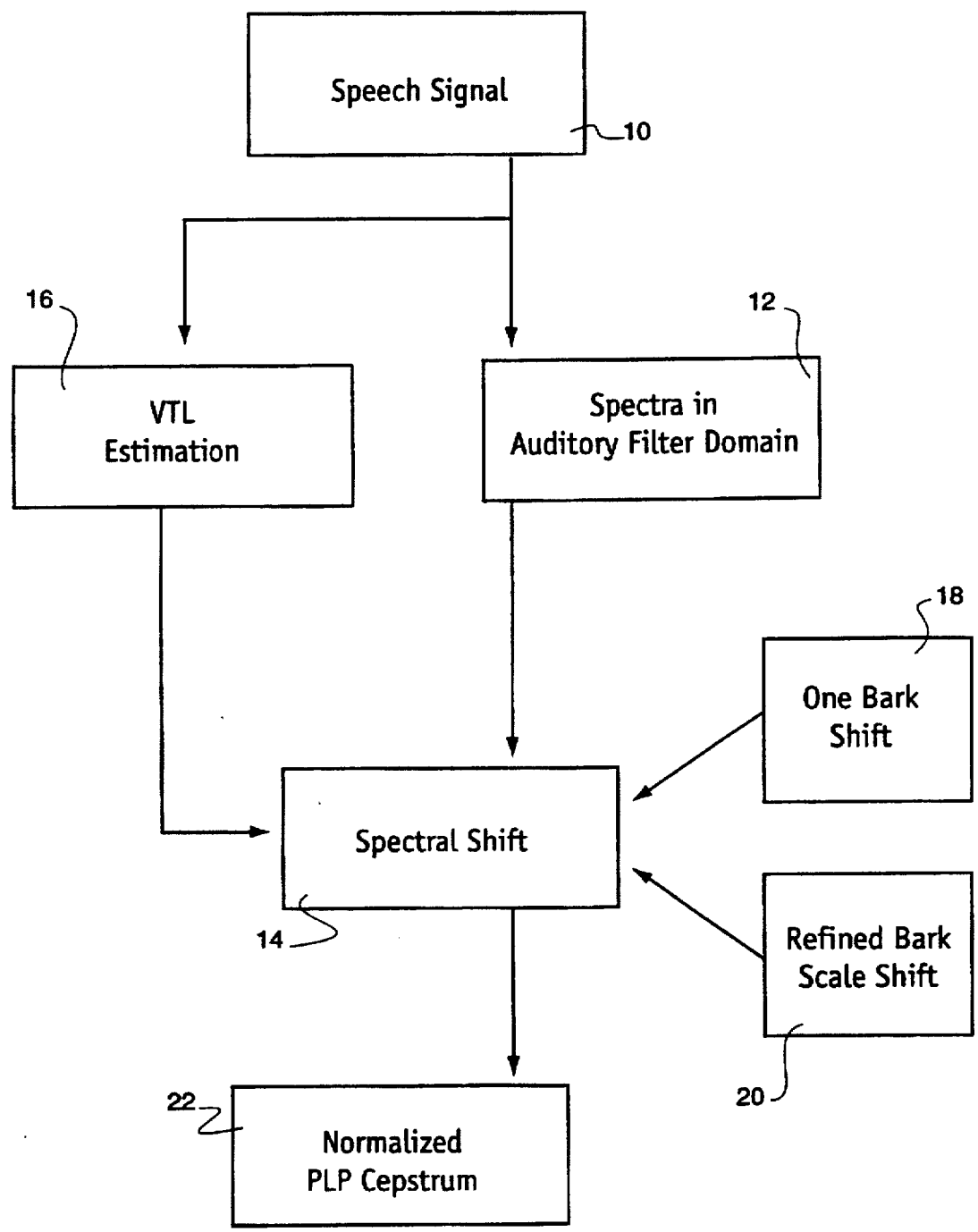
FIG. 7 is a block diagram illustrating the presently preferred manner in which the speaker normalization method may be implemented.

Referring first to FIG. 7, the incoming speech signal, represented by block 10, is subjected to Fourier transform covering the frequency range up to 5 kHz. This frequency range is divided into several bands spaced at 1 Bark intervals, where each band defines a filter bank. These filter banks thus convert the speech signal into spectra in the auditory filter domain (block 12) upon which the spectral shift of the invention is performed, as depicted by block 14. These spectra are used to generate perceptually-based linear predictive (PLP) coefficients.

As will be more fully discussed below, the present invention performs a spectral shift of selected spectra, as depicted at block 14, based on an estimation of the speaker's vocal tract length (VTL), which is in turn derived from the incoming speech signal 10. This is illustrated at block 16. In the following description two alternate embodiments are described for effecting the desired spectral shift. First described is a 1 Bark shift technique represented generally by block 18 in FIG. 7. Next described is a refined Bark scale shift represented by block 20 in FIG. 7. Either of these spectral shifting techniques may be employed with beneficial results as will be discussed. The spectral shifting techniques modify the PLP cepstrum coefficients in such a way that articulatory differences between individuals such as between male and female voices are effectively removed. In FIG. 7 the resultant PLP cepstrum coefficients (shifted in accordance with the invention) are depicted generally by block 22.

Vocal Tract Length (VTL) Estimation

The method for estimating the vocal tract length is based on the equivalence of the M-th order linear prediction model and a discrete M-th section acoustic tube model of the vocal tract. If the transfer function of the M-th order linear prediction model is represented as Equation 1, then the parameter is related to the acoustic tube length l by Equation 2, where ω is the angular frequency, T is the sampling period, and c is the sound velocity. The i-th formant frequency and bandwidth are given by a root of the polynomial A(z) as Equation 3 where $F_i$ and $B_i$ are the i-th formant frequency and bandwidth, respectively. Among an infinite number of shapes of different lengths calculated from a given set of formant frequencies and bandwidths, the length corresponding to a shape which minimizes an error criterion is selected as the estimated length. The error criterion is given as Equation 4 under the constraint Equation 5, where $S_i$ is the i-th cross-sectional area of a vocal tract area function calculated from predictor coefficients via reflection coefficients.

$$H(z) = K / \left( 1 + \sum_{i=1}^{M} a_i z^{-i} \right) \equiv K/A(z) \quad (1)$$

$$z = \exp(j\omega T) = \exp(j\omega 2l/Mc) \quad (2)$$

$$z_i = \exp\left( \frac{2l}{Mc} (-\pi B_i + j2\pi F_i) \right) \quad (3)$$

$$e(l) = \frac{1}{M} \sum_{i=1}^{M} (\ln S_i)^2 \quad (4)$$

$$\sum_{i=1}^{M} \ln S_i = 0 \quad (5)$$

Shift Theory

In vowel recognition, the perceptually based linear predictive analysis (PLP) is used. In the analysis equal loudness weighted energies of the critical band filters are calculated with adjacent filters being spaced at 1 Bark intervals. Since the spectral difference between male and female speakers is approximately 1 Bark, spectral shift by 1 Bark (1 Bark shift) in the auditory filter domain is convenient for normalizing inter-speaker variations. The Hertz-to-Bark frequency warping function is given by Equation 6, where f is Hertz scale frequency and z is Bark scale frequency.

$$z = 6 \log \left\{ \frac{f}{600} + \sqrt{\left(\frac{f}{600}\right)^2 + 1} \right\} \quad (6)$$

In the presently preferred embodiment we use 17 filter banks, which cover the frequency range up to 5 kHz. We derive 8th order PLP cepstrum coefficients from the filter bank energies as acoustic parameters for use in recognition experiments.

The basic idea of our 1 Bark shift method is to shift the respective filter bank energies to adjacent ones depending on the estimated VTL.

Although the filter bank frequency ranges (which locate at the same intervals in Bark scale) seem to be reasonable for 1 Bark shift, it is difficult to use them directly for speech normalization. The Hertz-to-Bark function can be divided into two ranges: at low frequencies it is proportional to the Hertz frequency; at medium and high frequencies it is proportional to the logarithm of the Hertz frequency. This indicates that certain constraints are required for Bark scale shift. To confirm this point of view, the frequencies in the F1-F2-F3 space were converted to the Bark scale, and it was found that the differences between male and female F1s are usually less than 0.5 Bark, whereas the differences in higher formants are approximately 1 Bark. For further details regarding F1-F2-F3, see "Control Methods Used in a Study of the Vowels," G. E. Peterson and H. L. Barney, *J. Acoust. Soc. Am.*, Vol. 24, No. 2, pages 175–184, March 1952.

This observation suggested to us that for lower frequencies, where 1 Bark might be too broad a scale for the shift, these filter energies should be kept unchanged, and only those of medium and high frequency are shifted by 1 Bark. Therefore, a shift threshold should be determined for the indices of filter banks for reliable and efficient spectral normalization.

As the estimated VTL of a speaker is used to determine whether 1 Bark shift is needed, a threshold for VTL is also required. The thresholds of filter index and VTL are determined through experiments described as follows. The ratio of the between class to within class Mahalanobis distance was used to measure the discriminant efficiency after the shifts using various thresholds, where a class is defined as a vowel category. The optimal threshold of speaker's VTL is found to be the average VTL of all speakers, and the optimal threshold of filter index is found to be 4, i.e., only those filters with indices from 5 to 17 are subject to energy shifts. These thresholds are adopted as the optimal 1 Bark shift conditions.

The distribution of estimated VTLs is well separated in terms of males and females and is useful for defining a refined Bark Scale Shift.

Figure 1:
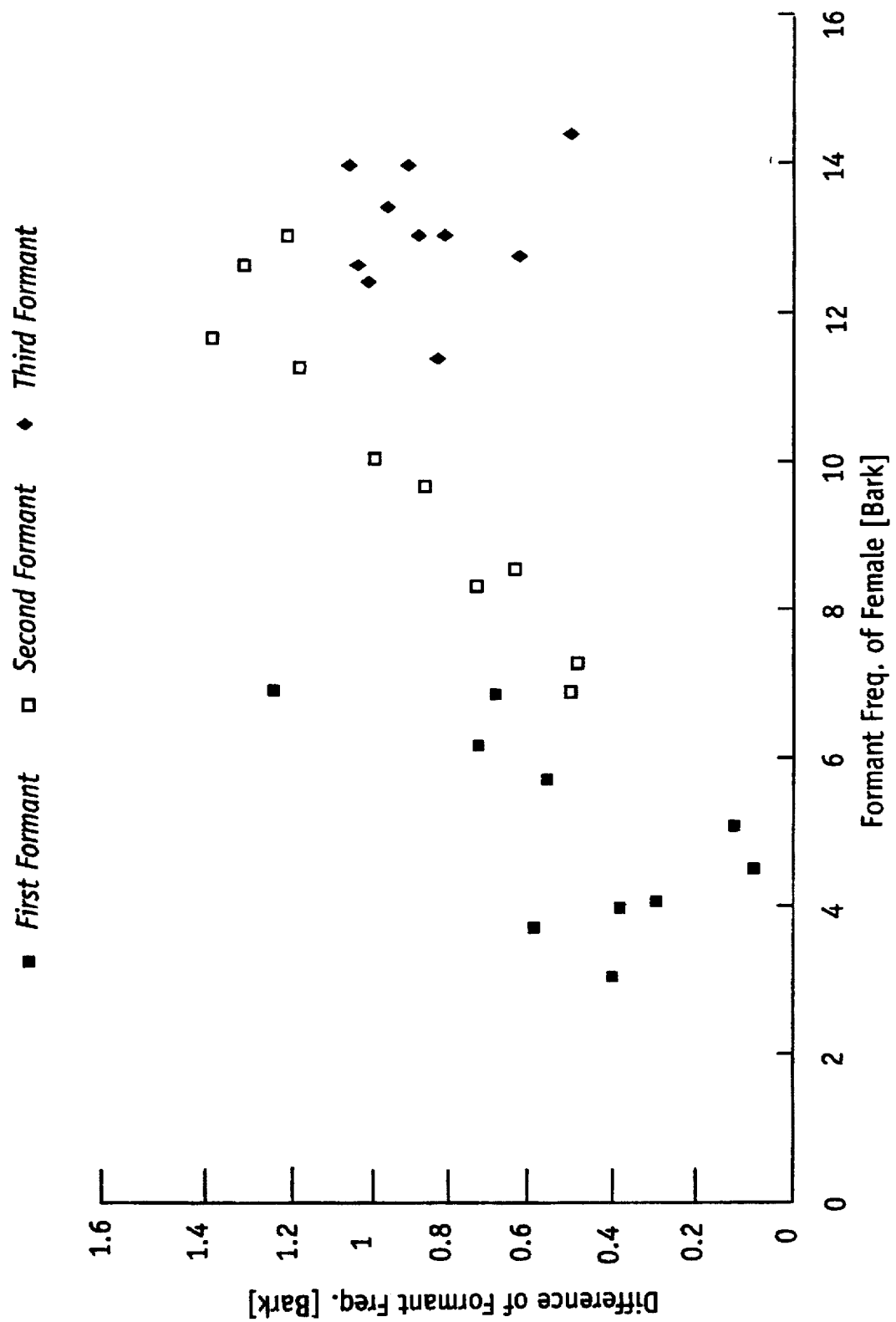
FIG. 1 is a scatter graph depicting differences of formant frequency between male and female.
Figure 2A:
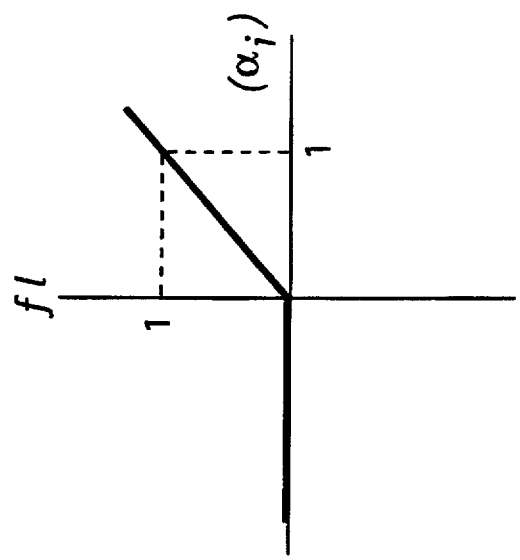
FIGS. 2a–2c (collectively referred to as FIG. 2) depict the weighting functions applied to the filter energies.
Figure 2B:
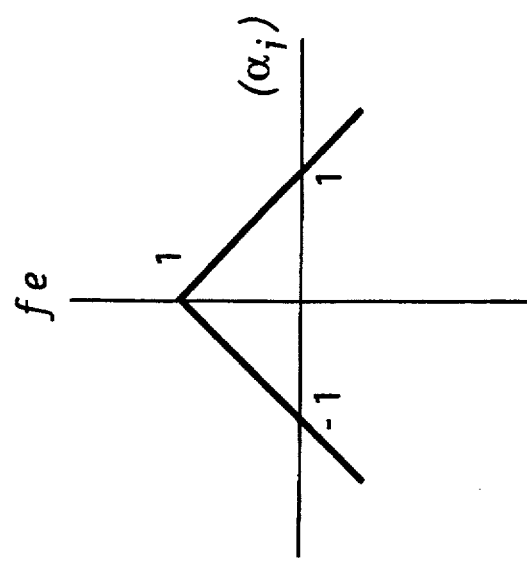
Figure 2C:
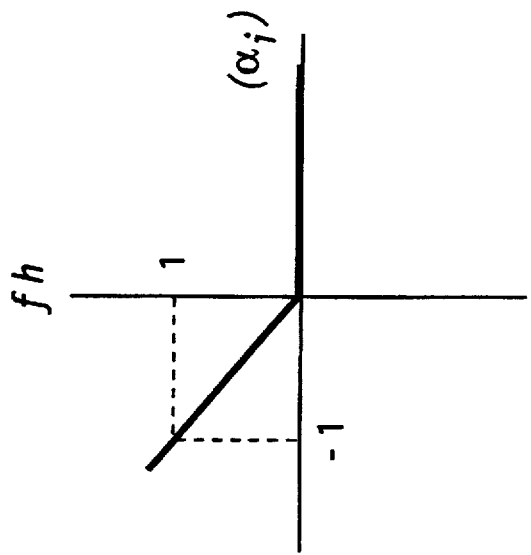

First, the refined Bark Scale Shift is defined by Equation 7, $$\log \tilde{F}_i = f_h(\alpha_i) \log F_{i-1} + f_c(\alpha_i) \log F_i + f_l(\alpha_i) \log F_{i+1} \quad (7)$$

where $F_i$ and $\tilde{F}_i$ are the energies of the i-th filter bank before and after the shift. Each shifted filter energy output is a linear combination of three neighboring filter energies, where the weights are defined by three functions shown in FIG. 2 and a parameter $\alpha_i$. From Equation 7, $\alpha_i$ determines the shift direction and value for the i-th filter energy as follows:

$$\begin{cases} \alpha_i < 0; & \text{Shift to High Frequency Direction} \\ \alpha_i = 0; & \text{No Shift} \\ \alpha_i > 0; & \text{Shift to Low Frequency Direction} \end{cases} \quad (8)$$

Next, we assume that the shift value $\alpha_i$ is determined by Equation 9, where $\alpha_{o,i}$ is the optimal constraint of filter indices derived in the 1 Bark shift study, and $\alpha_t$ is a value determining the scale of the spectral shift as a function of a speaker's VTL.

$$\alpha_i = \alpha_{o,i} \cdot \alpha_t \quad (9)$$

The parameters $\alpha_{o,i}$ and $\alpha_t$ are determined as follows.

The VTL space is divided into several bands and reference speakers are accordingly divided by their estimated VTLs. The vowel spectra from training speakers of each VTL band, $F_i^{k,j}$, are calculated by averaging the sample spectra of the speakers in the VTL band, where i denotes i-th filter, j VTL band and k vowel. The spectra of each band $F_i^{k,j}$ are shifted by Equation 7. The optimal shift value $\alpha_i$ is determined by minimizing the distortion defined by Equation 10, where the distortion is between the reference spectra $F_i^{k,o}$ and shifted spectra of a particular bend $\tilde{F}_i^{k,j}$. In Equation 10 L is the number of filter banks used to determine the optimal shift value near the i-th filter, K is the number of vowels and the reference spectra $F_i^{k,o}$ are calculated by averaging the spectra of speakers with their VTL longer than the mean.

$$\epsilon(\alpha_i) = \sum_{l=0}^{L-1} \sum_{k=1}^{K} (\log F_{i+l}^{k,o} - \log \tilde{F}_{i+l}^{k,j})^2 \quad (10)$$

Figure 3:
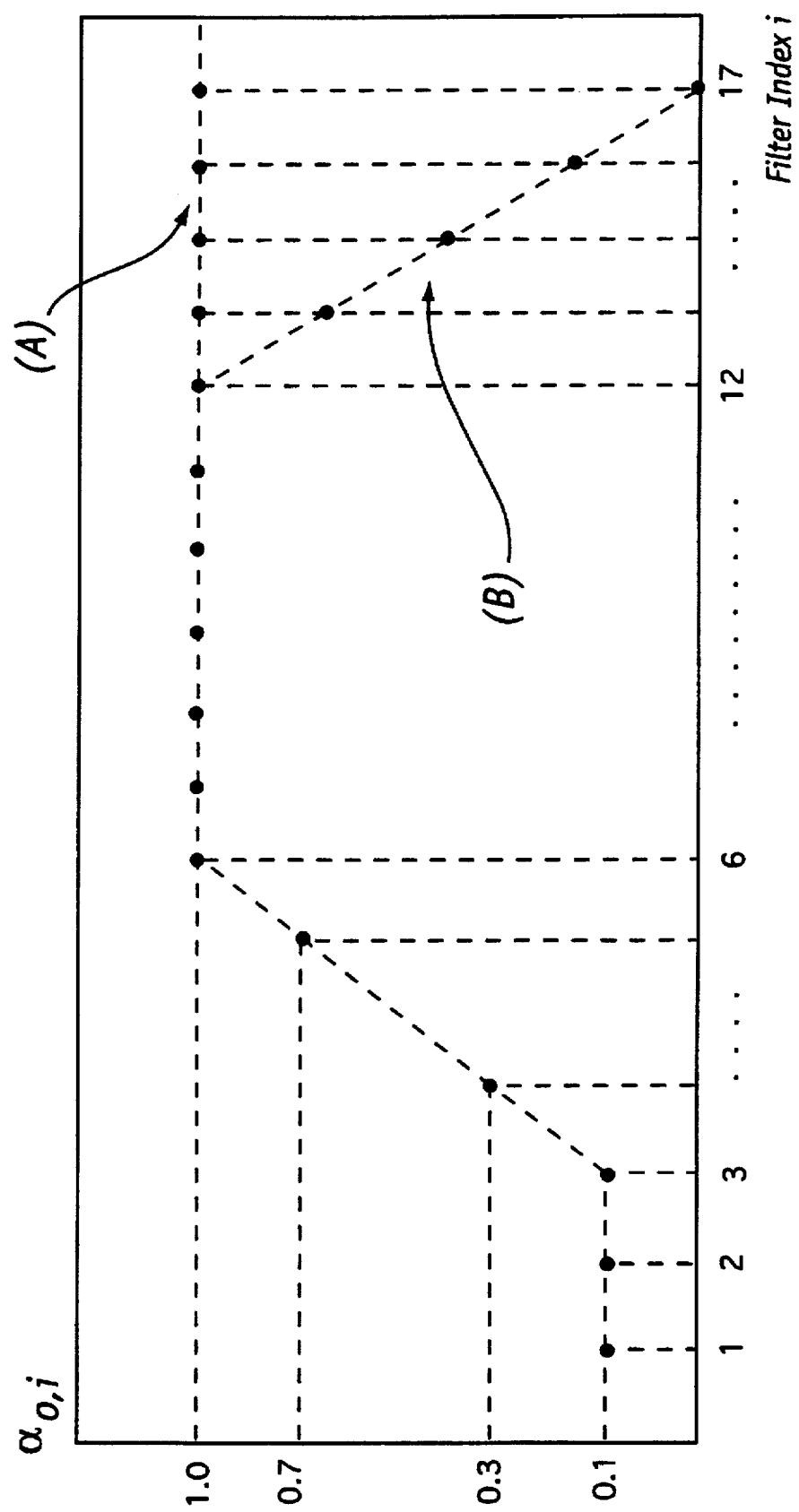
FIG. 3 is a graph depicting two filter index-dependent shift contours which may be alternately utilized in the present invention, contour B being presently preferred.

It is observed that the estimated optimal shift values of $\alpha_i$ have a similar contour for various VTL bands. This contour is therefore taken as the optimal constraint for filter indices in the refined Bark-scale shift. Specifically, two kinds of contours $\alpha_{o,i}$, (A) and (B), are derived; these are shown in FIG. 3. While medium and high frequency filters are subjected to energy shift in (A), only medium filters are subjected to energy shift in (B). The contour (B) comes from our observation that it is difficult to determine a constant shift value by a VTL in high frequency filters.

Figure 4:
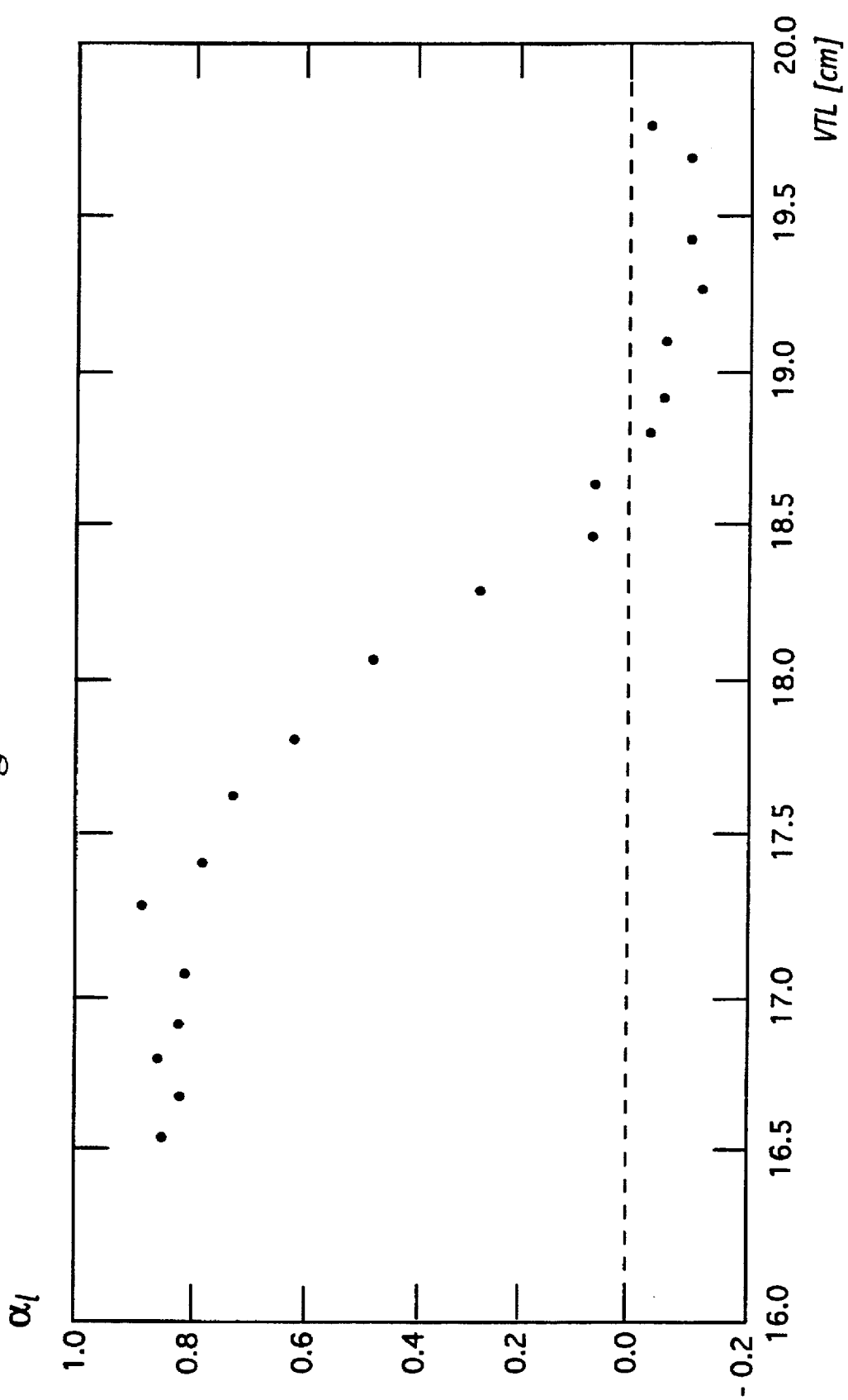
FIG. 4 is a graph depicting the code book of the VTL-dependent shift value ($\alpha_i$)

Once $\alpha_{o,i}$ is fixed, the optimal values of $\alpha_j$ for speakers with various VTLs are determined. An $\alpha_j$ is associated with VTLs as follows: the shift value of each filter is defined by a contour $\alpha_{o,i}$ and a value $\alpha_j$, and spectral distortion between the shifted spectra of a particular band j and the reference spectra is given in Equation (11) as a function of $\alpha_j$, where K is the number of vowels and l is the total number of filter banks. The value $\alpha_j$ which minimizes the spectral distortion is taken as the refined shift value associated with the VTL band. FIG. 4 shows the relation between the estimated shift value $\alpha_j$ and VTL corresponding to the shift contour (B) in FIG. 3. At recognition stage, shift values $\alpha_j$ are used for spectral shift according to the test speaker's VTL.

$$\epsilon(\alpha_j) = \sum_{k=1}^{K} \sum_{l=1}^{l} (\log F_i^{k,o} - \log \tilde{F}_i^{k,j}(\alpha_j))^2 \quad (11)$$

Experimental Results

For the VTL estimation experiments, the steady vowel portions are extracted from three different databases of [HD], [KB] and [TM], where [HD] consists of isolated words of the same context "hVd," [KB] consists of isolated words used for keyboard operations and [TM] consists of two sentences SA1 and SA2 in the commercially available TIMIT database. All data were sampled at or downsampled to 10 kHz and analyzed using linear prediction of order 8. For each vowel sample, a VTL is calculated to minimize the error criterion Equation 4 in the range of 12 to 22 [cm] and the VTL of a speaker is calculated by averaging all the VTLs computed from the vowel samples of the speaker.

Figure 5:
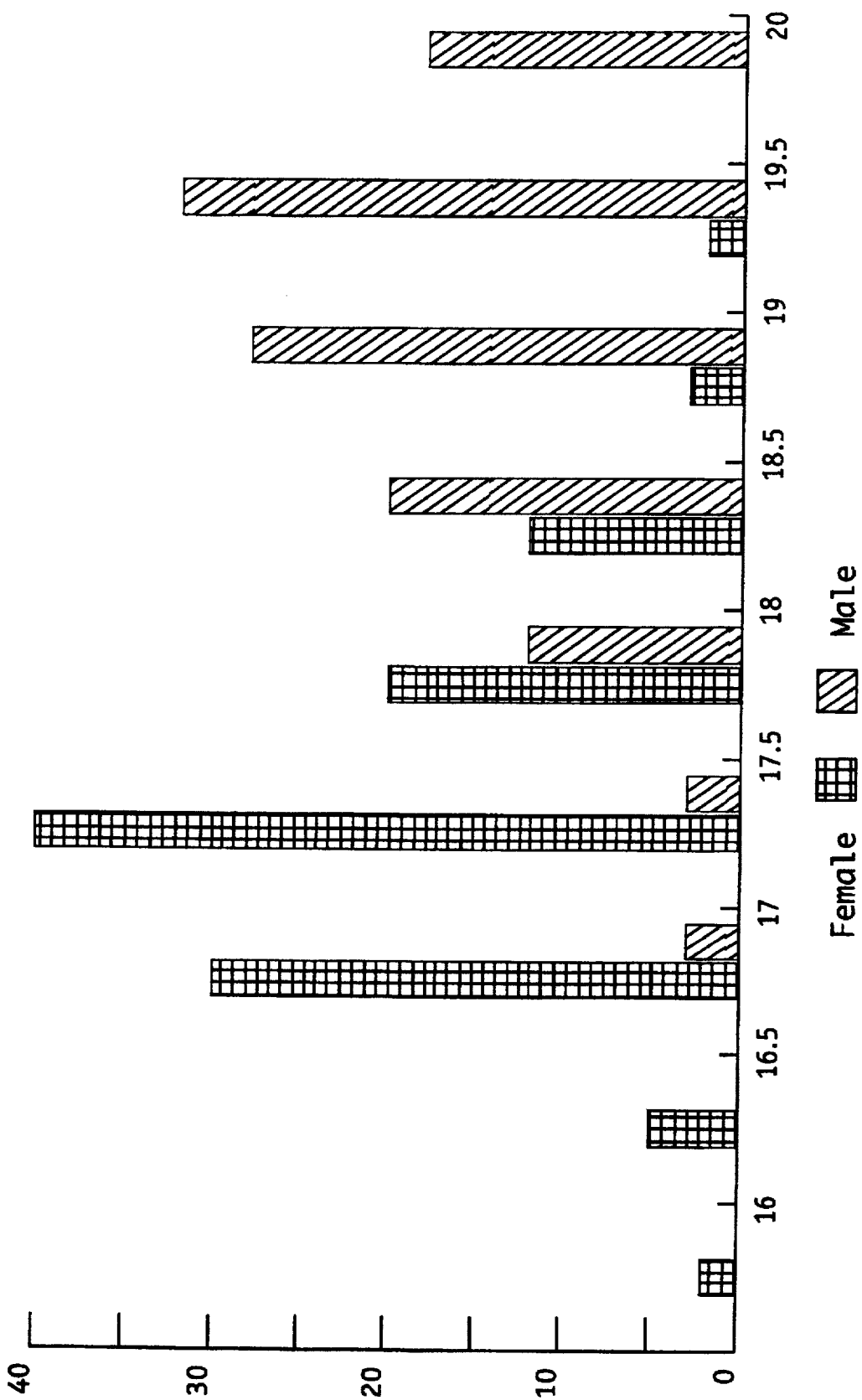
FIG. 5 is a bar graph representing a histogram of estimated vocal tract lengths for male and female speakers.

To confirm the validity of the estimated VTL, the mean VTL is calculated and shown in Table 1, and the distribution of 202 TIMIT speakers' VTL are computed separately for male and female speakers as shown in FIG. 5. The results verify the validity of the VTL estimation method for continuous speech and the normalization method based on the estimation of VTL seems to be more promising for reducing speaker variation than a simple 1 Bark shift.

TABLE 1

Number of Speakers and Mean Estimated VTL for Three Databases

| Database | Number of Speaker | | Estimated VTL [cm] | |
|---|---|---|---|---|
| | Male | Female | Male | Female |
| [HD] | 11 | 11 | 18.69 | 17.66 |
| [KB] | 6 | 4 | 18.71 | 16.75 |
| [TM] | 101 | 101 | 18.77 | 17.28 |

The vowels which are common among three databases are classified into six vowel groups of A, AE, E, R, I and U. Each group consists of one or more vowels, which are listed in Table 2. For each database, 8th order of PLP cepstrum coefficients are taken as features and Gaussian density models are estimated for each vowel group. Since [HD] and [KB] have only a small number of speakers, for the two databases each speaker is taken as a test speaker in turn and the rest of speakers are used training speakers. In [TM] 51 male and 51 female speakers are used as training speakers and the other 50 male and 50 female speakers are used as test speakers. The Gaussian likelihood [6] is used as the discriminant measure. Table 3 shows that the optimally constrained spectral shift produces approximately 10% error rate reduction for all three databases while the unconstrained spectral shift never gives improvement for any database. This vowel classification experiment shows the validity of the constrained spectral shift technique and indicates the potential usefulness of this technique for speech normalization of continuous speech.

TABLE 2

The Six Vowel Groups

| | A | AE | E | R | I | U |
|---|---|---|---|---|---|---|
| [HD] | aa, ah, ao | ae | eh | er | ix, iy | uw |
| [KB] | aa, ah, ax, ao | ae | eh | er | ih, ix, iy | uw |
| [TM] | aa, ao | ae | eh | axr | ih, ix, iy | ux |

TABLE 3

Vowel Classification Result Using One-Bark Shift (%)

| | No Spectral Shift | Unconstrained One-Bark Shift | Optimal Constrained One-Bark Shift |
|---|---|---|---|
| [HD] | 82.9 | 82.3 | 85.0 |
| [KB] | 61.7 | 58.7 | 64.3 |
| [TM] | 70.7 | 70.7 | 73.1 |

Figure 6:
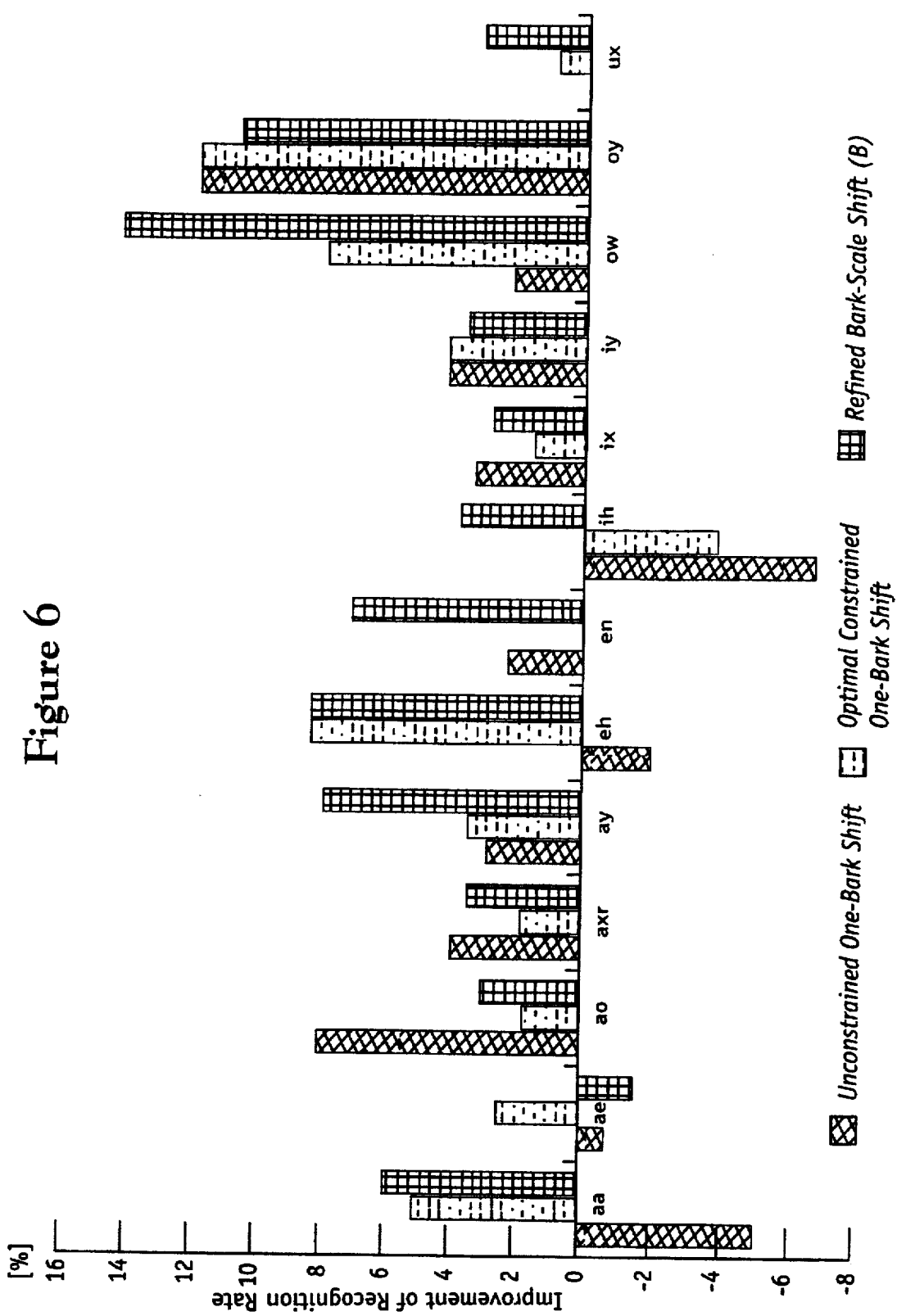
FIG. 6 is a bar graph illustrating the resultant improvement in vowel recognition after speaker normalization in accordance with the present invention.

To confirm the potential usefulness of the refined Bark scale shift, vowel classification experiments were carried out using the database [TM]. The two sentences SA1 and SA2 of [TM] have 13 vowels {aa, ae, ao, axr, ay, eh, en, ih, ix, iy, ow, oy, ux} and these 13 vowels were classified in the experiments. Vowel Gaussian density models estimated from 51 male and 51 female speakers were used to classify vowel spectra of the other 50 male and 50 female speakers. The 8th order PLP cepstrum and the delta PLP cepstrum were used as the acoustic parameters and the Gaussian likelihood as the discriminant measure. Table 4 shows that the refined Bark scale shift method gives the best result with 16% error rate reduction. Furthermore, FIG. 6 shows that the refined Bark scale shift produces steady improvement for almost all 13 vowels while 1 Bark shift often becomes unstable.

TABLE 4

Vowel Recognition Result Using the Refined Bark-Scale Shift (%)

|  | No Spectral Shift | Unconstrained One-Bark Shift | Constrained One-Bark Shift | Refined Bark-Scale Shift (A)/(B) |
|---|---|---|---|---|
| [TM] | 65.1 | 67.0 | 68.6 | 69.6/70.7 |

From the foregoing it will be seen that the spectral shift in auditory filter domain is quite beneficial for speaker normalization under the constraints described and that the estimated VTL of each speaker is an effective criterion for determining the shift value. If desired, the estimation of VTL with automatic detection of steady vowel portion may be employed to extend this shift technique into words/continuous speech recognition system where the effectiveness of this normalization method will be evaluated.

While the invention has been described in connection with the presently preferred embodiments, it will be understood that modifications may be made without departing from the spirit of the invention as set forth in the appended claims.

What is claimed is:

1. A method of processing a speech signal to reduce articulatory differences between individual speakers and thereby improve recognition of the speech by electronic recognizer circuitry, comprising:

transforming said speech signal into spectra in an auditory filter domain wherein said spectra represent a plurality of different energy bands having energies associated with a plurality of filter banks spaced apart in frequency;

deriving an estimation of the vocal tract length (VTL) of a speaker using said speech signal;

shifting said spectra by amounts established at least in part by said estimated VTL, the step of shifting said spectra being performed by selectively shifting the respective filter bank energies to adjacent banks in amounts that depend on said estimated VTL.

2. The method of claim 1 further comprising using said shifted spectra to generate perceptually-based linear predictive (PLP) cepstrum coefficients.

3. The method of claim 1 further comprising representing said shifted spectra by PLP cepstrum coefficients.

4. The method of claim 1 wherein said banks are spaced apart at 1 Bark intervals.

5. The method of claim 1 wherein said spectra represent a plurality of energies associated with a plurality of spaced apart frequency banks and wherein the step of shifting said spectra is performed by selectively shifting at least a portion of the energy in one bank to an adjacent bank in an amount determined at least in part by said estimated VTL.

6. The method of claim 5 wherein said banks are spaced apart at 1 Bark intervals.

7. The method of claim 1 wherein said step of shifting said spectra is performed by shifting some, but not all, of said spectra.

8. The method of claim 1 wherein said spectra represent a plurality of energies associated with a plurality of spaced apart frequency banks and wherein the step of shifting said spectra is performed by selectively shifting only those frequency banks above a predetermined frequency.

9. The method of claim 8 wherein said frequency banks are spaced apart at 1 Bark intervals and correspond to filters having indices from 1 to 17 and wherein said selective shifting is performed on only those frequency banks corresponding to filters with indices above 4.

10. The method of claim 1 wherein said VTL estimation is used to produce shift contours and wherein said spectra are shifted by amounts dependent upon said shift contours.

11. The method of claim 1 wherein said spectra represent a plurality of energies associated with a plurality of spaced apart frequency banks and wherein said VTL estimation is used to produce a VTL-dependent shift factor for each bank and wherein said shift factors are used to determine the degree to which energy in a given bank is shifted to an adjacent bank.

12. The method of claim 11 further comprising establishing a plurality of frequency bank-dependent shift contours and combining said shift contours with said shift factors to produce a set of optimal shift values, and using said optimal shift values to determine the degree to which energy in a given bank is shifted to an adjacent bank.

13. The method of claim 1 wherein said step of deriving an estimation of the vocal tract length is performed by calculating a preliminary VTL for each vowel sample in the speech and producing an average of said preliminary VTLs calculated to represent said VTL estimation.

14. The method of claim 13 wherein said step of calculating a preliminary VTL is performed by minimizing the error criterion $$\epsilon(l) = \frac{1}{M} \sum_{i=1}^{M} (\ln S_i)^2,$$

under the constraint of $$\sum_{i=1}^{M} \ln S_i = 0,$$

where $S_i$ is the i-th cross-sectional area of a vocal tract area function calculated from predictor coefficients via reflection coefficients.

* * * * *